Sept. 11, 1956 K. L. HUJSAK 2,762,831
PROCESS AND APPARATUS FOR REGENERATING ABSORBENT AND EXTRACTION MEDIA
Filed Jan. 2, 1952
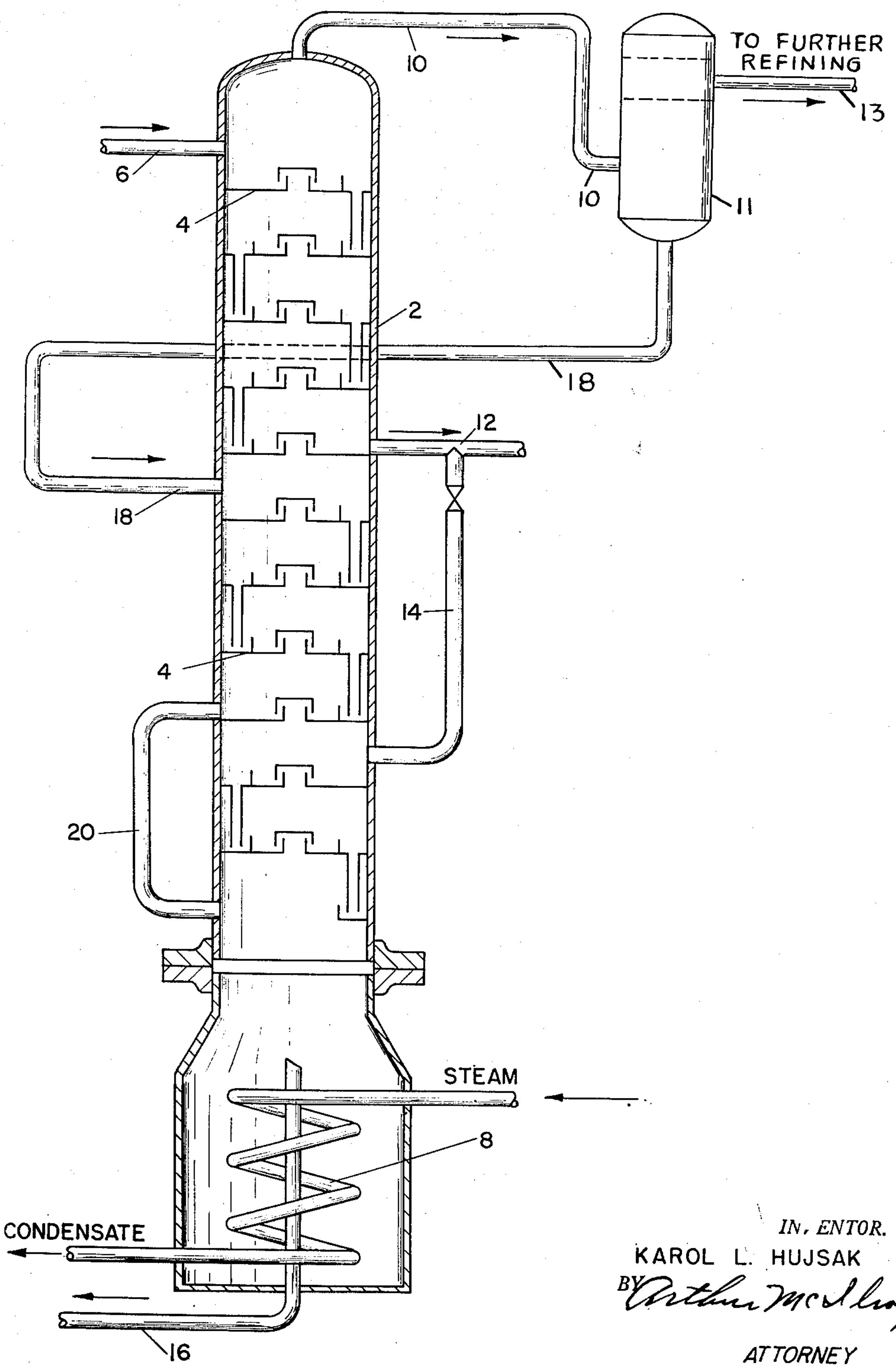
INVENTOR.
KAROL L. HUJSAK
BY Arthur McIlroy
ATTORNEY United States Patent Office 2,762,831

Patented Sept. 11, 1956

2,762,831

PROCESS AND APPARATUS FOR REGENERATING ABSORBENT AND EXTRACTION MEDIA

Karol L. Hujsak, Tulsa, Okla., assignor to Stanolind Oil and Gas Company, Tulsa, Okla., a corporation of Delaware Application January 2, 1952, Serial No. 264,634

4 Claims. (Cl. 260—450)

The present invention relates to a novel method and apparatus for regenerating absorbent and extraction media of various types. More particularly, it pertains to the recovery of gaseous or liquid components from such media by subjecting the rich absorbent or extract to the action of a vaporous stripping medium in an apparatus of the design contemplated by this invention.

The terms "absorbent" and "extraction media" as used in the present description and claims are intended, for the purpose of this invention, generally to be the equivalent of one another. Thus, the present invention may be employed either in the regeneration of media, for example, distillate oil, used to absorb gaseous constituents such as in the treatment of casinghead gas, refinery gas streams, and the like; or my process can be applied with equal success to the recovery of normally liquid components from extraction media. In either case, a problem exists as to how the absorption or extraction medium can be continuously regenerated with maximum recovery of the desired components and with minimum loss in volume and in efficiency of the extraction agent used.

In regenerating absorbent media employed in a variety of operations, numerous methods have been suggested and devised in an effort to effect a savings in the cost required to remove the absorbed component from the absorbent used. Thus, in the usual absorption processes for the recovery of the desired components of a gaseous or liquid stream, the absorption or extraction medium is circulated in a suitable tower countercurrently to the flow of the stream containing the components to be recovered. The resulting rich absorbent or extraction medium is thereafter sent to a stripping or regenerating unit where the aforesaid desired components are separated from the above-mentioned medium and collected overhead while the lean extraction medium thus obtained is returned to the extraction tower for use in a subsequent cycle. Purification of the medium in this fashion, however, is not entirely satisfactory for a number of reasons. For example, it has been found that in most any absorption or extraction process, after operating for an appreciable period of time, a build up of high-boiling impurities occurs in the system. This may be caused as a result of a gradual accumulation of polymeric materials produced by polymerization of light components present in the stream originally treated or from a decomposition of the absorption medium itself. Likewise dirt and other objectionable solid materials, such as scale and rust from the equipment employed, tend to collect in the system resulting in a decrease of efficiency in both the equipment and the absorption medium. Previously absorption media thus contaminated were purified by distillation thereof in a separate unit whereby the undesirable impurities were removed from the media in the form of a high-boiling residue. This procedure obviously is undesirable since it necessitates an interruption of the principal regenerating process besides requiring other additional equipment and heat for this purification step.

Other methods for removing undesirable impurities from the main absorption stream involved first splitting the rich absorption medium into major and minor streams prior to introduction of the major portion thereof into the stripping still. The smaller of the two streams was then sent to a relatively small still where it was stripped and the resulting vapors, consisting essentially of absorbed light constituents and absorbent, sent to the main stripping still along with steam which is used to strip the major portion of the rich absorbent originally introduced in the main stripping tower. The build up of high-boiling impurities in the system is substantially prevented by periodically or continuously withdrawing a stream from the bottom of the above-mentioned small stripping still. This process, while it serves to free the system of objectionable high-boiling impurities, does not exhibit a very high degree of stripping efficiency for the quantity of steam or other stripping agent. Moreover, the construction, maintenance and operation of a two-still system for such purposes possesses some rather serious objections from the standpoint of economy.

My invention has for an object a method whereby absorption or extraction media can be continuously purified in a single stripping column under conditions such that a high stripping efficiency within the column is maintained. It is a further object of my invention to provide a method and apparatus for continuously removing in an efficient and economical manner both the low- and high-boiling impurities normally occurring in a relatively wide variety of absorption and extraction media. A specific object of my invention is to provide a method and apparatus suitable for use in the regeneration of carboxylic acid salt solutions used to extract oxygenated chemicals from hydrocarbon synthesis oil, while at the same time avoiding the serious foaming problems normally encountered with conventional methods employed in the regeneration of such solutions or extracts.

Broadly the process of my invention involves introducing a rich extract or absorbent into the stripping section of a suitable tower and contacting the extract or rich absorbent with a vaporous or gaseous stripping agent under conditions such that at an intermediate point in the stripping zone the bulk of the relatively volatile absorbed constituents is separated and removed from the top of the tower. The entire stripped stream thus obtained is then withdrawn from the tower at an intermediate point in the stripping zone and the major portion of this stream is returned to the absorption or extraction tower for further use. However, a minor portion of the aforesaid withdrawn stream, which generally amounts to from about 5 to about 12 volume per cent of the total feed introduced into the stripping zone, is diverted and returned to the stripping section of the tower at a level below that at which the above-mentioned partially stripped stream is withdrawn. This diverted stream of partially stripped extract is further stripped by additional contact thereof with steam or other suitable stripping agent thus effecting a further separation of the dissolved low-boiling constituents from the extractant solution. The latter is then withdrawn as bottoms from the column in the form of a highly purified medium and returned along with the aforesaid partially purified extractant to the extraction tower for further use. Where the medium to be regenerated contains both low- and high-boiling constituents, which it is desired to separate therefrom, the stripping column is operated in a manner such that the low-boiling components are collected overhead while the extraction medium may be steam distilled and withdrawn as a side stream from an intermediate point in the stripping zone as previously explained. The residue obtained in the bottom of the stripping tower under these conditions constitutes high-boiling materials and foreign matter, such as dirt, scale or other finely divided solids, which can be readily purged from the system.

While the process of my invention has wide application in the regeneration of the absorbent and extraction media employed in numerous processes, as indicated above, I have found that it is particularly well adapted to the regeneration of soap or carboxylic acid salt solutions employed in recovering oil-soluble chemicals from hydrocarbon synthesis oil and the description which follows will be largely confined to such application.

The carboxylic acid salt solutions employed to recover chemicals from hydrocarbon synthesis oil may vary widely in composition; however, in the majority of instances I have found it preferable to use the carboxylic acid salts which are essentially non-surface active. Generally speaking, these acids are preferentially oil soluble and are composed chiefly of acids having less than twelve carbon atoms. A detailed description of these salts and their method of preparation and use will be found in copending application U. S. Serial No. 771,264 filed August 29, 1947, by S. W. Walker, now abandoned. Other carboxylic acid salt solutions having special advantages are those derived from the $C_2$ to $C_6$ carboxylic acid mixtures occurring in hydrocarbon synthesis oil. These salts are prepared by first neutralizing the acids present in the crude hydrocarbon synthesis oil stream, separating the resulting salts and thereafter regenerating the corresponding acids therefrom. After washing the acids thus liberated with water, they are subjected to fractional distillation, and the fraction distilled from about 118° to 205° C., collected and neutralized, preferably with caustic. The salts obtained in this manner, when dissolved in water concentrations of from about 20 to about 50 weight per cent, may then be used to extract non-acid chemicals such as aldehydes, ketones, esters and alcohols in hydrocarbon synthesis oil. Preparation and use of salt solutions of this type for the extraction of chemicals from the hydrocarbon synthesis oil is described and claimed in copending application, U. S. Serial No. 136,230, filed December 1, 1949, by N. M. Caruthers, now Patent No. 2,702,298. Also, if desired, the salt mixture resulting from the complete neutralization of the entire quantity of acids in the crude hydrocarbon synthesis oil may be used as the extractant solution to recover chemicals from the oil. Mixtures of such salts are commonly designated in the art as "total soaps."

In a continuous process for the extraction of chemicals from hydrocarbon synthesis oil involving the use of total soaps, the raw oil is first neutralized to produce a lower aqueous layer of these soaps, hereinafter referred to as neutralization soap, together with a relatively small percentage of dissolved chemicals and hydrocarbons. The resulting neutral oil layer is then countercurrently extracted with additional total soaps, and the resulting extract combined with the aforesaid neutralization soap and sent to a stripping column. This column is operated in a manner such that a lean purge soap stream, corresponding in volume to the volume of neutralization soap combined with the aforesaid total soap extract, is withdrawn from the bottom of the column and sent to an acid regeneration plant while the bulk of the lean soap stream is returned to the extraction tower. The purge soap stream, which must be withdrawn from the system in order to prevent the accumulation of excessive quantities of soap in the system, contains a small percentage of non-acid chemicals which contaminate the acids regenerated from the soap if allowed to remain therein. Accordingly, it has been proposed to remove these chemicals from the purge stream by subjecting the latter to a stripping operation in a separate stripping tower. While the steam required to remove chemicals from the rich soap extract fed to the principal stripper amounts to approximately one pound for each pound of soap, it is generally found necessary to employ a much higher steam to soap ratio, for example, from about 10:1, in the auxiliary stripping tower in order to remove substantially completely the last traces of non-acid chemicals from the soap. This extra steam is required primarily because the chemicals remaining in the purge soap stream are of high molecular weight, and, hence, less volatile than those taken overhead from the main stripping tower. The acids regenerated from the purge soap stripped in the above-mentioned manner are essentially free from objectionable impurities; however, the extra equipment and operating expense required to accomplish the purification of the purge soap in this fashion does not render such a procedure economically attractive.

The aforesaid purge soap stream actually amounts to only a fraction of the soap stream employed for the extraction operation; frequently it amounts to as little as one-tenth the volume of the extraction soap stream. Thus, if the same steam could be used to strip both the extraction and purge soap streams separately, the stripping ratio employed to strip the purge soap would be as much as ten times greater than that required for satisfactory stripping of the extraction soap. Accordingly, I have devised both a method and apparatus whereby the purge and extraction soap streams can be regenerated within the same stripping column, thus making possible a very substantial savings in operating cost and also resulting in a very highly purified purge soap stream from which can be obtained acids of high purity.

A preferred design of the stripping tower employed in accordance with my invention is shown in the accompanying drawing. The tower comprises an elongated cylindrical shell 2 equipped throughout with bubble cap trays 4. Feed consisting of a rich absorbent from a conventional absorption operation is introduced into the stripping zone of column 2 through inlet 6 and stripped by contacting an upwardly flowing column of steam generated by reboiler 8. Low-boiling components of the feed are thus separated from the absorbent and pass overhead through line 10 and are transferred to a separator 11 where stratification of the overhead product occurs. The upper organic layer consisting essentially of oil-soluble chemicals is withdrawn through line 13 and processed in accordance with methods outside the scope of my invention. The lower aqueous layer is withdrawn through line 18 and returned to the stripping section of column 2 as discussed elsewhere in this description. Below feed line 6 and in an intermediate portion of the stripping zone is a withdrawal line 12 through which the entire quantity of partially stripped feed is removed from the column. The bulk of this withdrawn stream is returned to the aforesaid absorption operation for further use while a minor portion thereof is diverted through valved line 14 and returned to the stripping zone of the column at a point below line 12. Since the stream returned to the column through line 14 has already been partially stripped, it is now possible to achieve a much higher degree of purification thereof with no over-all increase of steam requirements. The highly purified stream thus obtained is allowed to accumulate in the reboiler section of the column, and after reaching a given level therein is continuously withdrawn therefrom through line 16.

The column design shown in the drawing is especially adapted for use in regenerating extraction soap streams employed in recovering oil-soluble chemicals from hydrocarbon synthesis oil as generally discussed above. Thus, in stripping the soap of extracted chemicals, the water layer from the condensate produced in the overhead taken off through line 10 may be returned to the stripping zone of column 2 through line 18. By returning the condensate water, which contains water-soluble chemicals, to the column in this manner, an appreciable savings in these chemicals is effected since the distribution coefficients thereof are such that after a certain concentration has been built up in the water distillate layer, additional water-soluble chemicals present in the soap extract introduced through line 6 will be forced into the condensate organic layer which consists essentially of oil-soluble chemicals. Also the recycling of this water layer in the manner described serves as a suitable source of supply for all steam requirements.

As previously discussed in connection with the problems encountered in regenerating or stripping soap extracts of the type contemplated herein, rather serious difficulties are frequently experienced with foaming within the stripper and necessitate operation of the column at a greatly reduced capacity. This foaming is largely caused by the fact that in conventional procedures, the soap in the intermediate section of the stripping column becomes diluted with the aqueous reflux stream returned to the upper part of the column. As a result the diluted soap cannot be stripped at an efficient rate without causing excessive foaming in the column. The aqueous reflux stream can, if desired, be returned to the reboiler section of the stripping column to avoid this undesirable dilution effect; however, the single stripping stage thus afforded results in less complete stripping of the soap as well as in lower chemicals recovery. The aforesaid water layer or aqueous reflux stream also can be stripped separately in an additional stripper to recover the chemicals. Obviously, however, this method is undesirable because of the cost of additional equipment.

The column design shown in the accompanying drawing, however, is especially adapted to overcoming this foaming problem and such object is accomplished by the use of a by-pass line 20, the function of which serves to keep separate the downwardly flowing reflux water from the partially stripped soap stream returned to the column through line 14. Thus, the water returned to the reboiler section of the column through line 20 is vaporized before it contacts the partially stripped soap; and, hence, no dilution or foaming occurs. At the same time, the soap stream entering the column through line 14 and passing downwardly over the bubble trays immediately above the reboiler section is transformed into a state of high purity by the stripping action of the rising steam produced by the vaporization of the water returned to the column through line 20. Also, instead of diverting a minor portion of the partially stripped soap stream to the lower portion of the stripping zone, the entire partially stripped stream may be returned to said lower portion of said zone thereby affording a further separation of chemicals from the soap stream. Treatment of the distillate water layer may be the same as shown in the drawing; and, hence, foaming within the column is avoided since said water layer is returned to the stripping zone at a point in the column where it is impossible to effect a dilution of the soap stream.

The present invention may be further illustrated by the specific examples which follow.

*Example I*

An extract obtained by extracting neutral hydrocarbon synthesis oil with an aqueous 40 weight per cent total soap solution was introduced into a conventional stripping column at a rate of 835 lbs./hr., the hourly throughput of chemicals amounting to 50 pounds. The column was operated at a heat input of 500 B. t. u.'s per pound of bottoms; or, expressed otherwise, a total of 436 pounds of steam per hour were introduced into the reboiler. The overhead from this operation was condensed and allowed to stratify into two layers, an upper organic layer, comprising essentially chemicals which were withdrawn at the rate of 35 lbs./hr., and a lower water layer which was returned to the reboiler at a rate of 405 lbs./hr. The bottoms stream was withdrawn at the rate of 800 lbs./hr. and contained 15 pounds of chemicals. This bottoms stream was split was 720 pounds of the partially stripped soap being returned to the extraction operation and 80 lbs./hr. going to auxiliary still employed to strip the residual chemicals from the soap. The stream sent to this still corresponded in volume to the volume of soap generated in the neutralization of the raw hydrocarbon synthesis oil and subsequently combined with the soap extract to make up the feed to the stripping column. The small stripping column employed a heat input of 2,000 B. t. u.'s per pound of bottoms corresponding to 175 pounds of steam per hour. The distillate taken overhead was condensed and separated with 1.45 pounds of chemicals per hour being withdrawn from the separator. The distillate water layer was returned to the top of the small stripping column as reflux. The bottom stream was withdrawn at an hourly rate of 78.55 pounds and contained 0.15 pound of chemicals.

*Example II*

In a column of the design shown in the accompanying drawing, identical quantities of feed were employed as used in Example I. Also the same heat input as was used in the main stripping tower of Example I is employed, i. e., 436 pounds of steam per hour. The partially stripped soap stream withdrawn at an hourly rate of 800 pounds from an intermediate section of the stripping zone through a line corresponding to line 12 of the drawing is essentially of the same composition as the bottoms stream withdrawn from the main stripping tower in Example I. The stream thus withdrawn is split, as in Example I, with 720 pounds per hour being returned for use in the extraction step while 80 pounds per hour are bypassed around a portion of the stripping section of the column and returned to the lower portion of said stripping section through a line corersponding to line 14 of the aforesaid drawing. In this manner, the by-passed partially stripped soap stream can be purified even to a greater extent than is possible with the two-still system described in Example I. This is true because while the entire stripping operation, as carried out in accordance with my invention, employs steam at an hourly rate of 436 pounds, as compared to a total of 611 pounds per hour of steam for the over-all two-still system described in Example I, the above-mentioned by-pass stream, which is returned to the stripping zone at the rate of 80 pounds per hour, is stripped with steam introduced at an hourly rate of 436 pounds as compared to an hourly rate of 175 pounds employed in the system described in Example I. The bottoms thus obtained as a result of stripping the soap stream in accordance with my invention is withdrawn at the rate of 78.5 pounds per hour and contains no detectable concentration of neutral oxygenated organic chemicals. The acids regenerated from this bottoms stream are accordingly sufficiently pure to meet all commercial specifications.

While the procedure described above in Example 2 is especially suited for the regeneration of total soap extractant solutions employed in a continuous process wherein neutralization soap is continuously formed and accumulates in the system, this invention may be employed with equal success to the regeneration of other types of soap solutions used for the recovery of chemicals from hydrocarbon synthesis oil. Likewise, as previously ponted out, the process and apparatus of my invention may be employed in the recovery of any relatively low-boiling constituents from a wide variety of absorbent or extraction media. By the use of the processes of my invention for the recovery of dissolved components from absorption or extraction media, it is possible to obtain a higher stripping efficiency with substantially lower steam costs than is possible to achieve by the use of existing methods.

What I claim is:

1. In a process for removing dissolved oxygenated organic chemicals from an aqueous solution of a substantially non-surface active salt of a preferentially oil-soluble carboxylic acid whereby said chemicals are removed from said solution by the action of a vaporous stripping agent thereon, the steps which comprise introducing said solution into an upper portion of a stripping zone and contacting said solution with said stripping agent, withdrawing the resulting partially stripped solution from an intermediate point in said zone, withdrawing overhead from said zone a heterogeneous fraction comprising said chemicals and water, allowing said fraction to stratify and returning the water layer to said zone at a point below the level of said intermediate point, diverting at least a minor portion of said partially stripped solution to said zone at a point below the introduction of said water layer but above at least the lowermost stripping stage in said zone, contacting said minor portion of the stripped solution with said vaporous stripping agent, withdrawing from said zone all of the liquid components present at a point intermediate the levels in said zone at which said water layer and said minor portion of said stripped solution are introduced and returning said liquid components at a point below said stripping zone, and withdrawing from below said last mentioned point a stripped solution of said salt substantially free from said chemicals.

2. The process of claim 1 wherein the solution from which the dissolved oxygenated organic chemicals are removed is an aqueous solution of carboxylic acid salts derived from the neutralization of the acids present in crude hydrocarbon synthesis oil.

3. The process of claim 1 in which said portion of said partially stripped solution is a minor portion.

4. In a process for removing dissolved oxygenated organic chemicals from an aqueous solution of a substantially non-surface active salt of a preferentially oil soluble carboxylic acid, whereby said chemicals are removed from said solution by the action of a vaporous stripping agent thereon, the steps which comprise introducing said solution into an upper portion of a stripping zone and contacting said solution with said stripping agent, withdrawing the resulting partially stripped solution from an intermediate point in said zone, withdrawing overhead from said zone a heterogeneous fraction comprising said chemicals and water, allowing said fraction to stratify and returning the water layer to said zone at a point below the level of said intermediate point, returning said partially stripped solution to said zone at a point below the introduction of said water layer but above at least the lowermost stripping stage in said zone, thereafter contacting said stripped solution with said vaporous stripping agent, withdrawing from said zone all of the liquid components present at a point intermediate the levels in said zone at which said water layer and said partially stripped solution are introduced, and returning said liquid components at a point below said stripping zone, and withdrawing from below said last-mentioned point a stripped solution of said salt substantially free from said chemicals.

References Cited in the file of this patent

UNITED STATES PATENTS

| | | |
|---|---|---|
| 1,561,899 | Barbet | Nov. 17, 1925 |
| 1,567,457 | Newton | Dec. 29, 1925 |
| 1,987,267 | Ragatz | Jan. 8, 1935 |
| 2,196,878 | Stover | Apr. 9, 1940 |
| 2,345,934 | Gregory | Apr. 4, 1944 |
| 2,411,809 | Rupp et al. | Nov. 26, 1946 |
| 2,535,070 | Walker et al. | Dec. 26, 1950 |
| 2,605,276 | Bruner et al. | July 29, 1952 |
| 2,614,073 | Harcourt | Oct. 14, 1952 |
| 2,645,655 | Pearce | July 14, 1953 |